April 11, 1939.  H. N. JENKS  2,154,167
WATER TREATMENT
Filed June 26, 1933  2 Sheets-Sheet 1

INVENTOR.
HARRY N. JENKS
BY
ATTORNEY.

April 11, 1939.   H. N. JENKS   2,154,167
WATER TREATMENT
Filed June 26, 1933   2 Sheets-Sheet 2
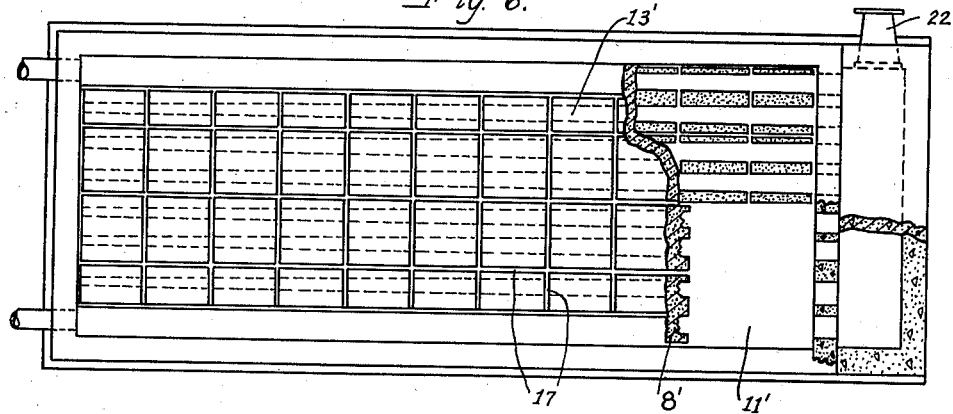
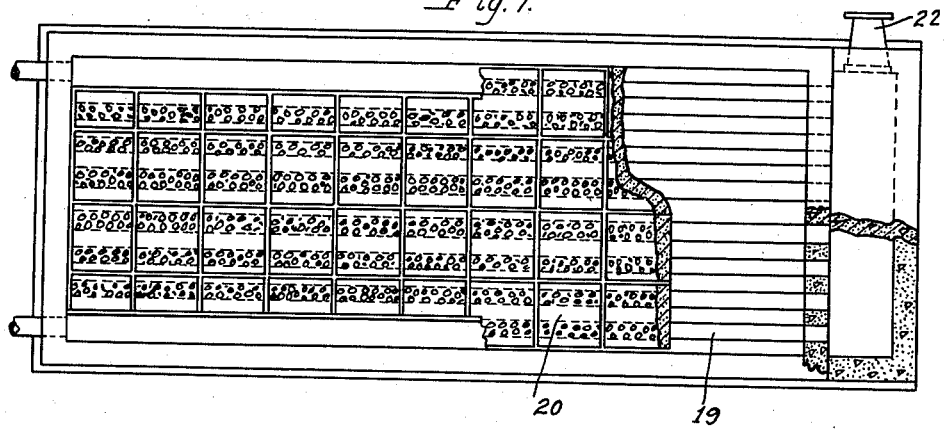
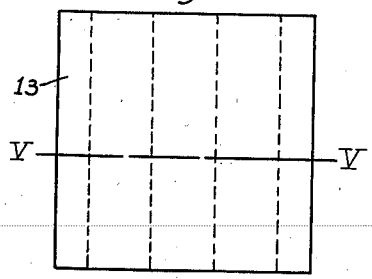
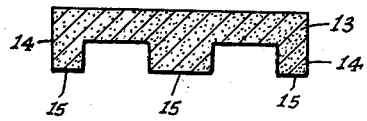
INVENTOR.
HARRY N. JENKS
BY
ATTORNEY.

UNITED STATES PATENT OFFICE 2,154,167

WATER TREATMENT

Harry Neville Jenks, Berkeley, Calif., assignor to The Carborundum Company, Niagara Falls, N. Y., a corporation of Delaware Application June 26, 1933, Serial No. 677,605

4 Claims. (Cl. 210—122)

This invention relates to improvements in water treatment; and for a fuller and more readily understood disclosure thereof, it has been illustrated in connection with both a rapid sand filter and a plate filter. In certain of its aspects, my invention is an improvement on the disclosure in my prior Patent 1,805,667 patented May 19, 1931.

In the treatment of water, and more particularly in the filtering of water to remove impurities such as turbidity, bacteria, etc., the water to be treated may be flowed into a receptacle and passed downwardly through a bed of sand, the filtered water being drawn off through the underdrain structure in the bottom of the receptacle. The impurities in the water are caught and filtered out by the sand, more particularly the uppermost layer of the same. There accumulates in this uppermost layer a slimy floc which increases the efficiency of the filter, until the sand becomes so clogged and polluted that it must be cleansed and made ready for another period of filtering operation.

It has been customary in cleansing the sand to force back up through the bed of sand a portion of the previously filtered water. This washwater, which is forced up through the sand, lifts the grains of sand so that they are in complete suspension. The upward movement of the water agitates the sand sufficiently so that the organic and other impurities are dislodged. The impurities are carried in suspension by the washwater; and by reason of the difference in specific gravity of the sand and the impurities, an hydraulic separation of the latter from the sand is effected, the impurities being skimmed off by the washwater gutters positioned at a suitable height above the level of the sand. When the washing period is terminated, the sand settles down again on the gravel bed over the underdrain structure, and the bed is again in condition for further filtration.

The customary gravel bed is an unstable support for the sand, so that there is danger of the sand making its way downward through the gravel, thus permitting "breaks" to occur. I have provided an underdrain structure which directly supports the sand bed, affording a stable and firm support, and moreover a substantially level and continuous supporting surface for the sand. There is no possibility of the sand trickling down through my underdrain structure.

The efficiency of a rapid sand filter depends to a large extent upon an even distribution of flow throughout the bed of sand. With the customary gravel bed type of filter, the perforated laterals are relied upon to give the primary distribution; and the uniformity of distribution throughout a given area, which may be termed diffusion, depends upon the uniformity of porosity of the gravel bed. I have taken care of both the primary distribution and the diffusion by a simple arrangement of permeable ceramic units, whereby I obtain a high order of uniformity in distribution of flow throughout the sand bed, both for filtering and backwashing.

I have shown in the accompanying drawings, not as limiting my invention but for the purpose of assisting in the description of the same, certain embodiments which my invention may assume; and in these drawings—

Figure 4 is a plan view of a ceramic unit which may be advantageously used in the construction of the apparatus shown in Figures 1, 2, 3 and 6;

Figure 5 is a detail sectional view on line V—V of Figure 4;

Figure 6 is a view similar to Figure 1 illustrating a further use to which my improved porous structure may be put; and Figure 7 is a plan view similar to Figure 1 but showing a modified construction.

At times the impurities lodged in the uppermost layer of sand cause the particles of sand to adhere together so firmly that the usual velocities of backwashing do not break up this adherence. I have found it particularly advantageous, in backwashing a sand bed which does not yield to the usual treatment with water, to force both water and air in the reverse direction through the underdrain structure of the apparatus. It is thus possible to more vigorously agitate the sand, and break up the adherence between the particles and aggregates of particles. I prefer to force the water and air simultaneously through the underdrain structure, so that as the bubbles of air make their way upwardly through the bed of sand, there is a simultaneous upward flow of water to wash out from the sand the adherent impurities.

Underdrain structures as heretofore constructed have not been well adapted to the forcing of both air and water in the reverse direction so as to clean and purify the bed of sand. The standard type of rapid sand filter employs a bed of gravel carefully graded so that the largest particles are in the lower strata and the smallest are in the top strata. Underdrain laterals extend under the bed so as to either carry off the filtered water or return the washwater to flow upwardly through the bed. The bed of sand is carried on top of the fine top layer of gravel. It is well known that if the backwashing operation is permitted to take place too vigorously, the careful grading of gravel becomes disarranged; and the sand is permitted to make its way downwardly through the coarser gravel, thus destroying altogether the effectiveness of the sand bed as a filtering medium. In accordance with my invention, I have provided an improved structure which may either be used of itself as a filter, or as an underdrain structure for supporting directly the bed of sand used in a rapid sand filter, or the bed of zeolite sand, for example, in the common form of water softening apparatus.

Figure 1:
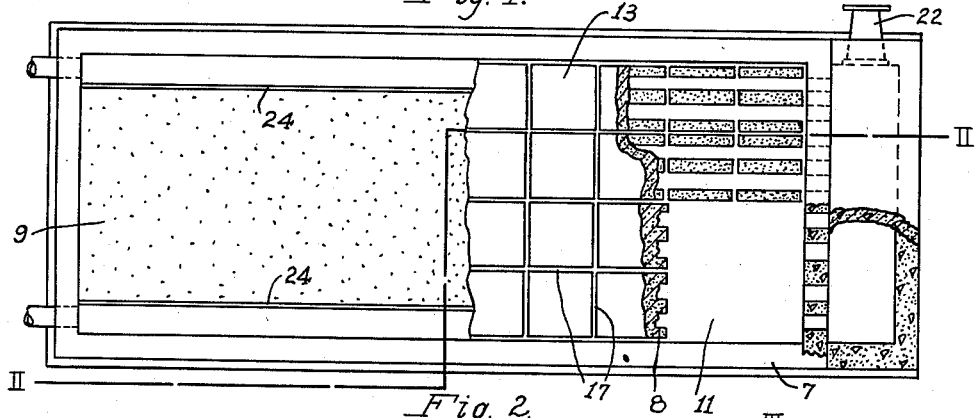
Figure 1 is a plan view partly broken away to illustrate details of the underdrain structure.
Figure 2:
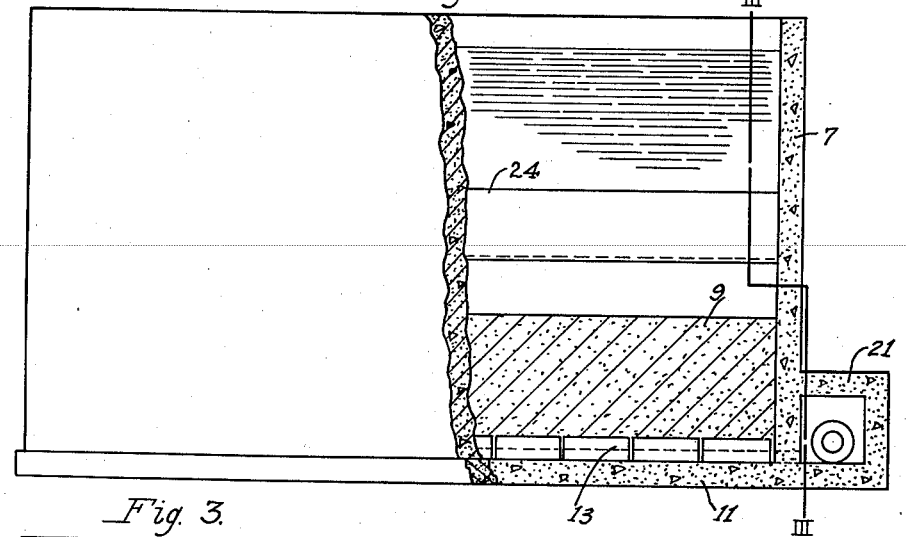
Figure 2 is a vertical section on line II—II of Figure 1.
Figure 3:
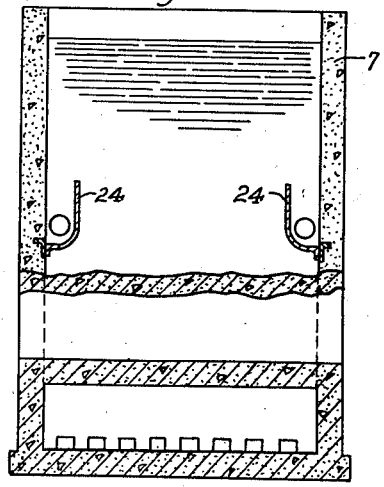
Figure 3 is a vertical section on line III—III of Figure 2.

The apparatus shown in Figures 1, 2 and 3 includes a receptacle 7 having in the bottom thereof a combined underdrain and distribution structure, generally indicated by the numeral 8. A bed of sand 9 overlies this structure; and it will be noted from the figures of the drawings that a substantially level and continuous supporting surface is afforded the bed of sand. The combined underdrain and distribution structure has as its foundation a layer of concrete 11, such as the bottom of receptacle 7. On this foundation are supported a plurality of rows of ceramic units, such as are shown in detail in Figures 4 and 5; and provision is made for bonding the units to the foundation. These ceramic units are preferably laid in place soon after the foundation is poured and while the same is still green; but sufficient time is given so that the foundation 11 takes a preliminary set. I apply a bond such as grouting to the contacting faces of the ceramic units and the foundation, and attach the units securely to the foundation. As is customary in the art, the ceramic units are made sufficiently wet before grouting so that these porous units will not rob moisture from and weaken the grouting. The adherence is particularly good if, as specified in the preferred procedure, the units are laid while the foundation 11 is still green.

The combined underdrain and distribution structure should include parallel channels separated from the bed of sand by the ceramic units. These channels could be formed in the foundation 11 itself, in which case the ceramic units would be flat plates resting on the ribs between adjacent channels. I prefer however, to employ ceramic units 13, which as shown in Figure 5 are provided with parallel ribs 14. These ribs are grouted to the foundation 11 as indicated in Figure 5, at 15. The units 13 are made sufficiently permeable so that the loss of head due to their resistance to flow is small compared to the loss of head through the conventional rapid sand filter underdrain system.

By ceramic unit, as the term is used in this specification and in the claims, I mean an igneously produced article, as for instance one which has been fired to sinter its particles together, one which has been burned to vitrify an intermixed bonding material, or even one in which an intermixed bond has been set or hardened by suitable heat treatment. A typical example of a ceramic unit suitable for this purpose may be produced as follows:

A mixture of 85% grain and 15% bond is thoroughly mixed. The grain may consist of No. 12 grit fused alumina. The bond may consist of

| | Parts |
|---|---|
| Albany clay | 76.9 |
| Kentucky bond clay | 19.3 |
| Cryolite | 3.8 |

An addition of two per cent of temporary binder is advantageous and the whole is moistened with water. After mixing, the mass is moulded at 500 lbs. per sq. in. and fired, the temperature being gradually raised to 1250° C. Two to five days are allowed to bring the ceramic units up to this temperature, after which they are held at this temperature for 10 to 36 hours, after which two to six days are allowed for cooling off. Ceramic units so produced have a permeability of 200 to 240 (measured as the number of cubic feet of air passed per square foot of area in one minute under pressure of two inches of water).

The units are assembled in parallel relation, and rows of units are placed end to end so that the registering openings form a channel or channels, depending upon whether or not one or more openings are provided in each unit. In assembling the units on the foundation 11, bonding materials which will form a waterproof layer, such as asphalt, or cement grout, may be used between the contacting faces of adjacent units. This bonding material 17, as shown in Figure 1, forms transverse and longitudinal partitions. This prevents the infiltration of water or air between the abutting ends of adjacent units into the channels; and accordingly fluid can pass from or to the channels in the ceramic units only by passing through the porous material forming the body of these units. The waterproof layer between adjacent rows of units makes certain that the fluid passing to or from the channel or channels in a given row of units shall all penetrate through the units in that particular row. Otherwise, a portion of the sand bed overlying the underdrain structure might, if that portion were considerably less permeable than an adjacent portion, cause the fluid to push over into the next row of units, thus by-passing the less permeable portion of the sand bed.

I provide suitable headers, conduits, controls and the like for the operation of the apparatus, either for collecting the filtrate flowing into the several channels, or when the direction of flow is to be in the opposite direction, for distributing fluid to the several channels. A manifold may be positioned at either end of the receptacle, or one at each end, or the manifold may transverse the filter itself. A manifold may be positioned at one end of the receptacle shown, and the filtering apparatus duplicated on the other side of the manifold, so that the one manifold cooperates with two filtering receptacles. In the illustrated construction shown in Figures 1 and 2 of the drawings, the manifold cooperating with the channels formed in the ceramic units is disposed at the right end of the receptacle. In the embodiment shown, a header 21 is connected to the several channels, and a connection 22 leads to the usual control mechanism for connecting the filter to discharge or to the backwashing system. Gutters or troughs 24 may be provided and positioned at a suitable height above the level of the sand for collecting and carrying away the washwater during backwashing. During this operation, the impurities will be washed out of the sand and into these gutters.

As the necessary controls for operating the apparatus as well understood in the art, further description is not considered necessary and illustration thereof is omitted.

In Fig. 6 I have shown substantially the same structure 8' as constitutes the underdrain structure 8 in Figs. 1 and 2; but in this embodiment no sand bed is used, and the porosity of the units 13' is decreased so that the units themselves perform the filtering function. They are bonded to the foundation 11' as in the embodiment first described, and a channel or channels are formed in the units to carry the fluid passing to or from the filter. The units are preferably partitioned or divided by an impermeable bonding material 17; although the separation by such a sealing layer between rows is not so important where the units themselves perform the filtering function as where a sand bed overlies the underdrain structure, and it may be omitted if its incorporation in the design would be troublesome.

The channels in this embodiment are shown as tapering, so that the cross sectional area of a given channel at a given point corresponds to the volume of flow at this point. The usefulness of this expedient is not limited to this embodiment, as it may be found equally advantageous to taper the channels in the embodiment shown in Figs. 1, 2 and 3.

In Fig. 7 I have shown a modified form of combined underdrain and distribution structure. In this form, as in the form shown in Figures 1, 2 and 3, I provide means for diverting the straight line flow directly through the permeable ceramic units which the fluid would naturally take. In this form the channels are formed in the foundation 19, and the permeable ceramic units 20 are flat plates secured to the foundation by grouting, by bolts, or other suitable securing means. For diverting the straight line flow the units may be made of unequal permeability, the material which is directly over the channels being of a character which is more dense, or has smaller pores, or is in some way rendered less permeable. The diverting means should, in total effect, substantially reduce the direct flow of fluid through the portions of the ceramic units directly above the channels, so as to divert flow to the neighboring portions of the ceramic units. In neither the form shown in Figs. 1, 2 and 3 nor in the form shown in Fig. 7 is it an essential that the diverting means be a continuous, unbroken sealing surface so as to make the diversion complete.

My improved construction has considerable advantage over structures known and used hitherto. My improved construction has a very considerable advantage over gravel in that less excavating needs to be done, as a shallower receptacle or filter structure is required than is the case where gravel is used for the underdrain system. A further advantage of my invention is the decrease in the loss of head as the water passes through the structure. The ceramic units which support the bed of sand, in accordance with my invention, may be made of a high permeability.

An important advantage over structures of the prior art is the possibility, with my improved structure, of forcing air and water therethrough during backwashing. The structures hitherto have been either too weak or too unstable to permit the use of high pressure during backwashing. It is well known that with a gravel underdrain construction, great care must be exercised in building up the pressure or velocity of the washwater during backwashing, as sudden increases of the same tend to disrupt the gravel bed. The ceramic units employed in the case of my invention are practically foolproof, as no harm can come to the installation by suddenly turning on pressure for backwashing.

A further advantage of the ceramic units is that they can be made of quite uniform permeability. This uniformity is greatly in excess of that which can be expected of such constructions as underdrain systems involving the use of a gravel bed. Due to this characteristic of my improved underdrain and distribution structure, the diffusion of fluid passing therethrough is much more uniform than in the structures commonly used for this purpose. A portion of the thick sand bed which has been considered requisite with these commonly used structures serves the function of making up for this lack of uniformity of diffusion. The high degree of uniformity of diffusion which is accomplished by the ceramic units themselves of my improved structure does away with the necessity for such a thick sand bed. As a result the thickness of the sand bed may be reduced from 27 inches to 12 inches, with the accompanying advantages that the depth to which excavation must be carried is reduced by about half the depth of the sand bed. The operating advantages of using a sand bed of half the customary thickness are obvious.

The functional characteristics of my invention are such that where both air and water are forced back through the underdrain structure, the cleansing of the bed of sand is greatly facilitated and can be accomplished without any danger of impairing the operation of the filter either in whole or in part. Moreover, the backwashing is so expedited that the period devoted to backwashing may be materially reduced.

An important advantage of my improved structure is that the flow of fluid through the bed of sand during backwashing is particularly uniform. This is true even though the bed of sand does not have uniform permeability. It is well known that during the operation of a rapid sand filter there is a tendency for certain areas of the sand bed to become more clogged than other portions. A particularly troublesome phenomenon is the formation of mud balls; and my improved construction insures that fluid shall be forced uniformly during backwashing through all portions of the sand bed, thus disintegrating the less permeable areas of the bed as well as those through which fluid flow is normal. With the fluid flow evenly distributed between the several rows of units, and throughout each unit of a row, a sand bed which has become so badly clogged as to give trouble during backwashing in accordance with the systems of the prior art, may be rapidly cleansed ready for another period of filtering operation.

While I have illustrated and described certain preferred embodiments which my invention may assume, it will be understood that my invention may be otherwise embodied and practiced within the scope of the following claims.

I claim:

1. In a water treatment apparatus of the type wherein water is passed through a bed of sand, a substantially impervious foundation, a plurality of permeable ceramic units supported on the foundation and assembled to afford a continuous level upper surface, impermeable means dividing adjacent units for preventing infiltration of fluid between adjacent units, and a bed of sand resting on the said upper surface of the ceramic units, the said foundation and the said ceramic units having a construction and arrangement whereby they define a plurality of distribution channels separated from the bed of sand by the said ceramic units, the said ceramic units being permeable to water to permit the passage of a fluid backwash which suspends the overlying sand in the backwash as discrete particles, impermeable to sand, and fastened to the said foundation whereby they remain unmoved by the said fluid backwash through the said distribution channels and the said ceramic units.

2. In a water treatment apparatus of the type wherein water is passed through a bed of sand, a substantially impervious foundation, a plurality of permeable ceramic units supported on the foundation and assembled in rows to afford a continuous level upper surface, and a bed of sand resting on the said upper surface of the ceramic units, the said foundation and the said ceramic units having a construction and arrangement whereby they define a plurality of distribution channels, each channel underlying and separated from the bed of sand by a row of ceramic units, impermeable means dividing adjacent rows of ceramic units for preventing penetration of fluid from one row to the next, the said ceramic units being permeable to water to permit the passage of a fluid backwash which suspends the overlying sand in the backwash as discrete particles, impermeable to sand, and fastened to the said foundation whereby they remain unmoved by a fluid backwash through the said distribution channels and the said ceramic units.

3. In the water treatment apparatus of the type wherein water is passed through a bed of sand, a substantially impervious foundation, a plurality of permeable ceramic units supported on the foundation by ribs and assembled to afford a continuous level upper surface, and a bed of sand resting on the said upper surface of the ceramic units, the said foundation, the said ribs and the said ceramic units defining a plurality of distribution channels, the said ceramic units being permeable to water throughout and having a variable permeability and arranged with the less permeable portions overlying the said distribution channels whereby they provide fluid passages impervious to sand between the said channels and the portions of the said upper surface overlying the channels, and between the said channels and the portions of the upper surface of the ceramic units overlying the said ribs, of equal resistance to permit the passage of a fluid backwash which suspends the overlying sand in the backwash as discrete particles, the said ceramic units being fastened to the said foundation whereby they remain unmoved by the said fluid backwash through the said distribution channels and the said fluid channels.

4. In a water treatment apparatus of the type wherein water is passed through a bed of sand, a substantially impervious foundation, a plurality of permeable ceramic units supported on the foundation and assembled to afford a continuous level upper surface, and a bed of sand resting on the said upper surface of the said ceramic units, the said foundation and the said ceramic units having a construction and arrangement whereby they define a plurality of distribution channels separated from the bed of sand by the said ceramic units, the said ceramic units being impermeable to sand and permeable to water throughout and having a variable permeability to water and arranged with the less permeable portions overlying the said distribution channels whereby a fluid backwash through the said distribution channels and the said ceramic units suspends all portions of the bed of sand in the said fluid as discrete particles.

HARRY N. JENKS.